(12) United States Patent
Okada

(10) Patent No.: US 12,302,897 B2
(45) Date of Patent: *May 20, 2025

(54) MICROCAPSULE COMPOSITION, METHOD FOR MANUFACTURING SAME, AGROCHEMICAL FORMULATION COMPRISING SAME AND WEED CONTROL METHOD

(71) Applicant: KUMIAI CHEMICAL INDUSTRY CO., LTD., Tokyo (JP)

(72) Inventor: Yuya Okada, Tokyo (JP)

(73) Assignee: KUMIAI CHEMICAL INDUSTRY CO., LTD., Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 17/287,250

(22) PCT Filed: Oct. 18, 2019

(86) PCT No.: PCT/JP2019/041199
§ 371 (c)(1),
(2) Date: Apr. 21, 2021

(87) PCT Pub. No.: WO2020/090530
PCT Pub. Date: May 7, 2020

(65) Prior Publication Data
US 2021/0386060 A1 Dec. 16, 2021

(30) Foreign Application Priority Data
Oct. 31, 2018 (JP) .................. 2018-205755

(51) Int. Cl.
*A01N 25/28* (2006.01)
*A01N 43/80* (2006.01)
*A01P 13/00* (2006.01)

(52) U.S. Cl.
CPC ............. *A01N 25/28* (2013.01); *A01N 43/80* (2013.01); *A01P 13/00* (2021.08)

(58) Field of Classification Search
None
See application file for complete search history.

(56) References Cited

U.S. PATENT DOCUMENTS

| 10,091,999 | B2 * | 10/2018 | Arai | .............. A01N 43/80 |
| 2012/0035052 | A1 | 2/2012 | Kobayashi et al. | |
| 2017/0006870 | A1 | 1/2017 | Arai et al. | |
| 2021/0392881 | A1 * | 12/2021 | Okada | ............. A01N 25/28 |

FOREIGN PATENT DOCUMENTS

| EP | 2 420 484 | 2/2012 |
| JP | 2002-66307 | 3/2002 |
| JP | 2017-39650 | 2/2017 |
| WO | 2015/129729 | 9/2015 |

OTHER PUBLICATIONS

Yu, F.; et al. "Preparation of polyurea . . . " Materials, 2021, 14(13), 3753.*
Dictionary.com "dry" definition, accessed Feb. 6, 2025, no pagination. (https://www.dictionary.com/browse/dry).*
International Search Report (ISR) issued Dec. 17, 2019 in International (PCT) Application No. PCT/JP2019/041199.
Development and application of the micro/nano fabrication system of capsules and fine particles, Aug. 31, 2003, CMC Publishing Co., Ltd., front cover, pp. 211-212 English translation of the relevant part (p. 212, lines 12-28), cited in the specification.

* cited by examiner

*Primary Examiner* — Erin E Hirt
(74) *Attorney, Agent, or Firm* — WENDEROTH, LIND & PONACK, L.L.P.

(57) ABSTRACT

The present invention aims to provide a microcapsule composition that enables reduction or prevention of injury of useful plants caused by pyroxasulfone, a production method therefor, an agrochemical formulation containing the same, and a weed control method. A method of producing a microcapsule composition containing pyroxasulfone encapsulated therein, the method including: an emulsifying dispersion step of performing high-speed stirring of pyroxasulfone crystal particles, isocyanate, oily phase, and aqueous phase at a peripheral speed of 6.000 to 30,000 mm/s to allow emulsifying dispersion of the oily phase in the aqueous phase, to form emulsion particles of the oily phase; and a film formation step of forming a film on at least the surface of the emulsion particles of the oily phase formed by the emulsifying dispersion step; and the like are provided.

14 Claims, No Drawings

MICROCAPSULE COMPOSITION, METHOD FOR MANUFACTURING SAME, AGROCHEMICAL FORMULATION COMPRISING SAME AND WEED CONTROL METHOD

TECHNICAL FIELD

The present invention relates to a microcapsule composition and a production method therefor, an agrochemical formulation containing it, and a weed control method. More specifically, the present invention relates to a microcapsule composition that enables reduction or prevention of injury of useful plants caused by pyroxasulfone, a production method therefor, an agrochemical formulation containing the same, and a weed control method.

BACKGROUND ART

It is known that pyroxasulfone shows high herbicidal effect on grass weeds such as *Echinochloa crus-galli* var. *crus-galli* (inubie), *Digitaria ciliaris* (mehishiba), *Setaria viridis* (enokorogusa), *Poa annua* (suzumenokatabira), Johnson grass, *Alopecurus myosuroides* (nosuzumenoteppo), *Lolium multiflorum* (Italian rye grass), *Lolium rigidum* (rigid ryegrass), *Avena fatua* (karasumugi), Beckmannia syzigachne (kazunokogusa), and wild oat; broadleaf weeds such as *Persicaria lapathifolia* (oinutade), *Amaranthus viridis* (aobiyu), *Chenopodium album* (shiroza), *Stellaria* (hakobe), *Abutilon theophrasti* (ichibi), *Sida spinosa* (amerikakingojika), *Sesbania exaltata* (amerikatsunokusanemu), ragweed, morning glory, *Galium spurium* var. *echinospermon* (yaemugura), *Veronica persica* (oinunofuguri), *Veronica hederifolia* (furasabaso), *Lamium amplexicaule* (hotokenoza), and *Viola mandshurica* (sumire); and perennial and annual cyperaceous weeds such as *Cyperus rotundus* (hamasuge), *Cyperus esculentus* (kihamasuge), *Kyllinga brevifolia* var. *leiolepis* (himekugu), *Cyperus microiria* (kayatsurigusa), and *Cyperus iria* (kogomegayatsuri); and has a broad herbicidal spectrum.

However, on the other hand, it is also known that, in conventional use of a herbicide containing pyroxasulfone, crop injury to useful plants occurs in some cases depending on various factors such as the temperature; climate conditions including wind and sunlight; soil conditions including soil texture and soil organic matter content; cultivation management conditions including shallow transplanting depth and deep water management; and agent application conditions including uneven spraying or excessive spraying of the herbicide. Cases to which pyroxasulfone is applicable have been limited since it sometimes causes crop injury to useful crops and useful plants such as fruit trees, vegetables, flowers and ornamental plants, and trees, for example, wheat, barley, rye, maize, sorghum, soybean, rapeseed, safflower, sunflower, flax, peanut, sesame, potato, sweet potato, onion, garlic, sugar beet, cotton, mint, and lawn grass.

On the other hand, microencapsulation techniques for agrochemical active components are known, and, for example, Non-patent Document 1 discloses microcapsules of various useful compounds such as agrochemical active components, which microcapsules contain various substances as wall materials; and a production method therefor.

However, since, in conventional microcapsule formulations, elution of agrochemical active components occurs always through water in the field, microencapsulation of agrochemical active components has been thought to be techniques useful for environments where plenty of water is present, such as paddy fields. Thus, it has been conventionally thought that application of the microencapsulation techniques for agrochemical active components is difficult for fields such as dry fields, where water is only poorly present. Also, a microencapsulation method that enables further reduction of crop injury has been demanded.

RELATED ART DOCUMENT

Non-Patent Document

[Non-patent Document 1] Koishi et al. "Development and application of the micro/nano fabrication system of capsules and fine particles", CMC Publishing Co., Ltd., published in Aug. 31, 2003 (whole document)

SUMMARY OF THE INVENTION

Problems to be Solved by the Invention

An object of the present invention is to provide a microcapsule composition that enables reduction or prevention of injury of useful plants caused by pyroxasulfone, a production method therefor, an agrochemical formulation containing the same, and a weed control method.

Means for Solving the Problems

As a result of intensive study to solve the above problems, the present inventors discovered that the problems can be solved by microencapsulation of pyroxasulfone through an emulsifying dispersion step at a particular peripheral speed, thereby completing the present invention.

That is, the present invention is as follows.

(1) A method of producing a microcapsule composition containing pyroxasulfone encapsulated therein, the method including:
an emulsifying dispersion step of performing high-speed stirring of pyroxasulfone crystal particles, isocyanate, oily phase, and aqueous phase at a peripheral speed of 6,000 to 30,000 mm/s to allow emulsifying dispersion of the oily phase in the aqueous phase, to form emulsion particles of the oily phase; and
a film formation step of forming a film on at least the surface of the emulsion particles of the oily phase formed by the emulsifying dispersion step.

(2) The method of producing a microcapsule composition according to (1), wherein the isocyanate is aromatic isocyanate.

(3) The method of producing a microcapsule composition according to (1) or (2), wherein the aqueous phase further contains a water-soluble active hydrogen-containing compound.

(4) The method of producing a microcapsule composition according to (3), wherein the water-soluble active hydrogen-containing compound is at least one compound selected from the group consisting of polyols and polyamines.

(5) The method of producing a microcapsule composition according to (3) or (4), wherein, in the film formation step, the isocyanate is reacted with at least one of water and the water-soluble active hydrogen-containing compound in the aqueous phase, to form a film containing polyurethane or polyurea as a material on at least the surface of the emulsion particles of the oily phase formed by the emulsifying dispersion step.

(6) The method of producing a microcapsule composition according to any one of (1) to (5), wherein the aqueous phase further contains an emulsifier.

(7) The method of producing a microcapsule composition according to (6), wherein the emulsifier is polyvinyl alcohol.

(8) The method of producing a microcapsule composition according to any one of (1) to (7), wherein the microcapsule composition has a volume average diameter of 5 to 100 µm.

(9) The method of producing a microcapsule composition according to any one of (3) to (8), wherein the total amount of the isocyanate and the water-soluble active hydrogen-containing compound is 1 to 10 parts by mass with respect to 1 part by mass of the pyroxasulfone.

(10) The method of producing a microcapsule composition according to any one of (1) to (9), wherein the pyroxasulfone crystal particles have a volume average diameter of 2 to 50 µm.

(11) A microcapsule composition produced by the production method according to any one of (1) to (10).

(12) The microcapsule composition according to (11), wherein the pyroxasulfone crystal particles are not exposed on the surface of the microcapsule composition.

(13) An agrochemical formulation including the microcapsule composition according to (11) or (12).

(14) The agrochemical formulation according to (13), which is a powder, granule, wettable powder, wettable granule, aqueous suspension, or oily suspension.

(15) The agrochemical formulation according to (13) or (14), containing no crop injury-reducing agent.

(16) A weed control method including performing treatment with the microcapsule composition according to (11) or (12), or with the agrochemical formulation according to any one of (13) to (15), in agricultural land for growing a useful plant.

(17) The weed control method according to (16), wherein the useful plant is soybean or cotton.

(18) The weed control method according to (16) or (17), wherein the agricultural land is a dry field.

(19) The weed control method according to any one of (16) to (18), wherein the treatment is soil treatment or foliage treatment.

Effect of the Invention

According to the present invention, a microcapsule composition that enables reduction or prevention of injury of useful plants caused by pyroxasulfone, a production method therefor, an agrochemical formulation containing the same, and a weed control method can be provided.

MODE FOR CARRYING OUT THE INVENTION

The method of producing a microcapsule composition of the present invention is a method of producing a microcapsule composition containing pyroxasulfone encapsulated therein, the method including:

an emulsifying dispersion step of performing high-speed stirring of pyroxasulfone crystal particles, isocyanate, oily phase, and aqueous phase at a peripheral speed of 6,000 to 30,000 mm/s to allow emulsifying dispersion of the oily phase in the aqueous phase, to form emulsion particles of the oily phase; and a film formation step of forming a film on at least the surface of the emulsion particles of the oily phase formed by the emulsifying dispersion step. Here, in the present invention, the peripheral speed means a peripheral speed on the outermost circumference of the rotary blade of the stirrer.

(Emulsifying Dispersion Step)

In the method of producing a microcapsule composition of the present invention, the emulsifying dispersion step is a step of performing high-speed stirring of pyroxasulfone crystal particles, isocyanate, oily phase, and aqueous phase at a peripheral speed of 6,000 to 30,000 mm/s to allow emulsifying dispersion of the oily phase in the aqueous phase, to form emulsion particles of the oily phase. From the viewpoint of biological effects such as the herbicidal effect and the crop injury-reducing effect, the peripheral speed is more preferably within the range of 9,000 to 30,000 mm/s. The high-speed stirring within such a range may be carried out until emulsion particles of the oily phase are formed. The period of the high-speed stirring is within the range of usually 5 to 60 minutes, preferably 5 to 30 minutes, more preferably 10 to 30 minutes.

In the emulsifying dispersion step, it is important to perform the high-speed stirring of pyroxasulfone crystal particles, isocyanate, oily phase, and aqueous phase at a peripheral speed within the range described above. Although the order of mixing the components is not limited, isocyanate is preferably preliminarily added to the oily phase.

Specific examples of the method of adding the components include a method in which isocyanate is dissolved or dispersed in an oily phase such as a hydrophobic solvent, and then an aqueous phase is added thereto, followed by further adding pyroxasulfone in a crystalline state thereto and mixing the resulting mixture.

Another example is a method in which pyroxasulfone in a crystalline state is added to an oily phase such as a hydrophobic solvent, and then isocyanate is added thereto, followed by further adding an aqueous phase thereto and mixing the resulting mixture. Still another example is a method in which isocyanate is dissolved or dispersed in an oily phase such as a hydrophobic solvent, and then pyroxasulfone in a crystalline state is added thereto, followed by further adding an aqueous phase thereto and mixing the resulting mixture.

In these mixing methods, stirring may be carried out for dissolving, dispersing, or mixing each component. The stirring rate is not limited, and may be, for example, 4,000 to 30,000 mm/s. Taking into account biological effects such as the herbicidal effect and the crop injury-reducing effect, the peripheral speed is preferably 6,000 to 30,000 mm/s, more preferably 9,000 to 30,000 mm/s. In particular, before and after the addition of pyroxasulfone, the high-speed stirring is carried out at a peripheral speed of preferably 6,000 to 30,000 mm/s, more preferably 9,000 to 30,000 mm/s, from the viewpoint of dispersibility.

More specifically, in the emulsifying dispersion step, isocyanate is dissolved or dispersed in an oily phase such as a hydrophobic solvent by stirring at a peripheral speed of preferably 4,000 to 30,000 mm/s, more preferably 6,000 to 10,000 mm/s, and then an aqueous phase is added thereto. Pyroxasulfone in a crystalline state is added thereto while the mixture is stirred at a peripheral speed of preferably 4,000 to 30,000 mm/s, more preferably 6,000 to 30,000 mm/s, still more preferably 9,000 to 30,000 mm/s, and then high-speed stirring is performed at a peripheral speed of 6,000 to 30,000 mm/s, preferably 9,000 to 30,000 mm/s, to allow emulsifying dispersion of the oily phase in the aqueous phase. By this, emulsion particles of the oily phase can be formed.

In another method, pyroxasulfone in a crystalline state is added to an oily phase such as a hydrophobic solvent, and isocyanate is further added thereto with stirring at a peripheral speed of preferably 4,000 to 30,000 mm/s, more preferably 6,000 to 10,000 mm/s, followed by allowing dissolution or dispersion by stirring at a peripheral speed of preferably 4,000 to 30,000 mm/s, more preferably 6,000 to 10,000 mm/s. Thereafter, an aqueous phase is added thereto, and the resulting mixture is subjected to high-speed stirring at a peripheral speed of 6,000 to 30,000 mm/s, preferably 9,000 to 30,000 mm/s, to allow emulsifying dispersion of the oily phase in the aqueous phase. By this, emulsion particles of the oily phase can be formed.

In still another method, isocyanate is dissolved or dispersed in an oily phase such as a hydrophobic solvent by stirring at a peripheral speed of preferably 4,000 to 30,000 mm/s, more preferably 6,000 to 10,000 mm/s, and then pyroxasulfone in a crystalline state is added thereto. Thereafter, an aqueous phase is added thereto while the mixture is stirred at a peripheral speed of preferably 4,000 to 30,000 mm/s, more preferably 6,000 to 10,000 mm/s, and then high-speed stirring is performed at a peripheral speed of 6,000 to 30,000 mm/s, preferably 9,000 to 30,000 mm/s, to allow emulsifying dispersion of the oily phase in the aqueous phase. By this, emulsion particles of the oily phase can be formed.

Pyroxasulfone, which is used in the method of producing a microcapsule composition of the present invention, is a known herbicide. Pyroxasulfone whose crystal particles have a volume average diameter of 2 to 50 μm, preferably 2 to 30 μm may be used. From the viewpoint of securing the quality of the microcapsule composition obtained, the volume average diameter is more preferably 2 to 20 μm, especially preferably 2 to 10 μm. The content of pyroxasulfone in the microcapsule composition is not limited, and is within the range of preferably 5 to 30% by mass, more preferably 10 to 30% by mass, still more preferably 10 to 20% by mass.

The isocyanate used in the method of producing a microcapsule composition of the present invention is preferably hydrophobic. Specific examples of the isocyanate include aliphatic or aromatic isocyanates. The isocyanate is preferably an aromatic isocyanate. The isocyanate is preferably a bi- or higher-functional polyisocyanate. Specific examples of isocyanates that may be used in the present invention include monomers, and oligomers including dimers and trimers, of aliphatic diisocyanates such as hexamethylene diisocyanate; monomers, and oligomers including dimers and trimers, of aromatic diisocyanates such as toluene diisocyanate and diphenylmethane diisocyanate; and polymethylene polyphenyl polyisocyanates represented by the following Formula (I):

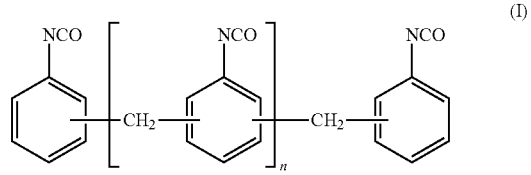

(I)

wherein n represents an integer of 1 or more.

These may be used individually, or two or more of these may be used in arbitrary combination.

The oily phase used in the method of producing a microcapsule composition of the present invention is not limited as long as it allows dissolution or dispersion of pyroxasulfone and isocyanate. The oily phase is preferably a hydrophobic solvent. Specific examples of the hydrophobic solvent include ethers such as ethyl ether, dioxane, ethylene glycol monoethyl ether, dipropyl ether, dibutyl ether, and tetrahydrofuran; aliphatic hydrocarbons such as normal paraffin, naphthene, isoparaffin, kerosene, and mineral oils; aromatic hydrocarbons such as benzene, toluene, xylene, solvent naphtha, alkylnaphthalene, and phenylxylylethane; halogenated hydrocarbons such as dichloromethane, chloroform, and carbon tetrachloride; esters such as ethyl acetate, diisopropyl phthalate, dibutyl phthalate, dioctyl phthalate, dimethyl adipate, diisobutyl adipate, and diisodecyl adipate; and vegetable oils such as soybean oil, rapeseed oil, cottonseed oil, and castor oil. In particular, the hydrophobic solvent is preferably an aromatic hydrocarbon, especially preferably phenylxylylethane.

From the viewpoint of preliminarily increasing the viscosity of the oily phase, the hydrophobic solvent may be a mixture with a polyester block copolymer. By the increasing of the viscosity of the oily phase, a difference in the viscosity is produced relative to the viscosity of the aqueous phase, so that the pyroxasulfone can be efficiently encapsulated into the microcapsule. The polyester block copolymer used in the present invention may have a viscosity within the range of about 10 to 500 mPa·s, preferably about 20 to 400 mPa·s, more preferably about 30 to 300 mPa·s in terms of the viscosity of the mixture with the hydrophobic solvent at 20° C. Commercially available products such as ATLOX RHEOSTRUX™ 100-PW (MV), manufactured by CRODA, may be used. The content of the polyester block copolymer in the microcapsule composition is not limited, and is within the range of preferably 0.05 to 0.3% by mass, more preferably 0.1 to 0.3% by mass, still more preferably 0.1 to 0.2% by mass. In the present invention, the viscosity was measured using a B-type viscometer (manufactured by Toki Sangyo Co., Ltd.). The measurement conditions were as follows: use of a rotor No. 2; rotation speed, 30 rpm; and measurement temperature, 20° C.

The aqueous phase used in the method of producing a microcapsule composition of the present invention contains water as an indispensable component, and may also contain an emulsifier. The emulsifier is not limited as long as aggregation does not occur in the film formation step. The emulsifier is preferably polyacrylic acid or a water-soluble salt thereof, polyethylene glycol, polyvinyl pyrrolidone, polyvinyl alcohol, or the like. Polyvinyl alcohol is preferred. Although the emulsifier may be added in the emulsifying dispersion step, it is preferably preliminarily dissolved in the aqueous phase. Alternatively, the emulsifier may be dissolved in water, and may be used in the form of an aqueous solution. The concentration of the water-soluble polymer in the aqueous solution is not limited, and is usually selected within the range of 0.5 to 5% by mass.

(Film Formation Step)

The film formation step in the method of producing a microcapsule composition of the present invention is a step of forming a film on at least the surface of the emulsion particles of the oily phase formed by the emulsifying dispersion step The film formation may be carried out by a film formation method in a common method of producing a microcapsule composition, wherein water in the aqueous phase may be reacted with isocyanate at the liquid-liquid interface between the emulsion particles of the oily phase formed in the emulsifying dispersion step and the aqueous phase, or a water-soluble active hydrogen-containing compound may be further added to the aqueous phase, to allow reaction with isocyanate. In the film formation step, by reacting the isocyanate with at least one of water and the water-soluble active hydrogen-containing compound in the aqueous phase, a polyurethane or polyurea film can be formed on at least the surface of the emulsion particles of the oily phase formed by the emulsifying dispersion step.

Reaction conditions for the film formation depend on the isocyanate, water-soluble active hydrogen-containing compound, emulsifier, and hydrophobic solvent selected. For example, the film formation may be carried out by stirring at room temperature, or with heating at a temperature of 50 to 100° C., preferably at a temperature of 50 to 80° C., for about 10 minutes to 6 hours, preferably about 1 to 4 hours. The stirring in this process may be carried out at a peripheral speed of about 300 to 5,000 mm/s, preferably within the range of 300 to 3,000 mm/s, more preferably within the range of 300 to 2,000 mm/s.

Examples of water-soluble active hydrogen-containing compounds that may be contained in the aqueous phase include those which contribute to cross-linking of isocyanate in the film formation step, such as polyols and polyamines. However, polyols that contribute as emulsifiers are not included therein. Specific examples of the polyols include glycol compounds and glycerin. Specific examples of the polyamines include ethylenediamine, diethylenetriamine, triethylenetetramine, and hexamethylenediamine. From the viewpoint of the pyroxasulfone release property, polyols, especially glycol compounds containing a polyoxyethylene group and/or a polyoxypropylene group, are preferred. Specific examples of the glycol compounds containing a polyoxyethylene group and/or a polyoxypropylene group include polyoxypropylene polyol and polyoxyethylene polyoxypropylene block polymers (polyoxyethylene polyoxypropylene glycol). Polyoxyethylene polyoxypropylene block polymers are especially preferred. These may be used individually, or two or more of these may be used in combination.

The water-soluble active hydrogen-containing compound may be added in any stage of the emulsifying dispersion step or the film formation step. In cases of a polyol, especially in cases of a glycol compound containing a polyoxyethylene group and/or a polyoxypropylene group, it is preferably added in the film formation step.

The ratios of the isocyanate as a reactant in the oily phase, and the water-soluble active hydrogen-containing compound and the emulsifier used as desired, are stoichiometrically selected based on a reaction formula for production of the polyurethane or polyurea.

Preferably, the amount of isocyanate blended may be selected within the range of 1 to 10 parts by mass, preferably 1 to 5 parts by mass, more preferably 1 to 3 parts by mass, with respect to 1 part by mass of pyroxasulfone. Further, the ratios may be appropriately adjusted such that the total amount of the isocyanate and the water-soluble active hydrogen-containing compound is 1 to 10 parts by mass, preferably 1 to 7 parts by mass, more preferably 2 to 5 parts by mass, with respect to 1 part by mass of pyroxasulfone.

Further, if desired, the method of producing a microcapsule composition in the present invention may be carried out in the presence of a nonionic surfactant(s) such as sorbitan fatty acid esters, sucrose fatty acid esters, polyoxyethylene fatty acid esters, polyoxyethylene resin acid esters, polyoxyethylene alkyl ethers, polyoxyethylene alkyl phenyl ethers, alkyl polyoxyethylene polypropylene block copolymer ethers, polyoxyalkylene styryl phenyl ethers, polyoxyethylene castor oils, and polyoxyethylene hydrogenated castor oils; anionic surfactant(s) such as alkyl sulfates, alkyl benzene sulfonates, lignin sulfonates, alkyl sulfosuccinates, naphthalene sulfonates, alkyl naphthalene sulfonates, naphthalene sulfonic acid formalin condensate salts, and alkyl naphthalene sulfonic acid formalin condensate salts; and/or an antifoaming agent(s) such as polyalkylsiloxanes and higher fatty acid salts. These additives may be preliminarily included in the oily phase or the aqueous phase, or may be added separately from the oily phase and the aqueous phase.

Further, in the method of producing a microcapsule composition in the present invention, a water-soluble thickener such as xanthan gum, carboxymethyl cellulose or a salt thereof, gum arabic, gelatin, dextrin, or water-soluble starch; and/or a dispersant such as naphthalene sulfonic acid formalin condensate salt; may be added, if desired. The amount of the water-soluble thickener blended is not limited, and is preferably within the range of 0.1 to 1.0 parts by mass with respect to 100 parts by mass of the microcapsule composition. The amount of the dispersant blended is not limited, and is preferably within the range of 1 to 10 parts by mass with respect to 100 parts by mass of the microcapsule composition. The addition of the water-soluble thickener and/or the dispersant is preferably carried out after completion of the reaction.

A microcapsule composition of the present invention is produced by the method of producing a microcapsule composition of the present invention.

In the microcapsule composition of the present invention, the pyroxasulfone crystal particles are preferably not exposed on the surface of the composition.

A volume average diameter (volume median diameter) of the thus obtained microcapsule composition of the present invention may be appropriately selected. The volume average diameter is selected within the range of usually 5 to 100 μm, preferably 5 to 50 μm, more preferably 5 to 30 μm, still more preferably 5 to 15 μm.

The microcapsule composition of the present invention may be used as it is for agricultural land for growing a useful plant, or may be formulated into an arbitrary formulation to be used in the form of an agrochemical formulation.

It is important for an agrochemical formulation of the present invention to contain the microcapsule composition of the present invention. If necessary, additive components that are commonly used may be arbitrarily included.

Examples of the additive components include carriers such as solid carriers and liquid carriers, surfactants, binders, tackifiers, thickeners, coloring agents, spreaders, stickers, cryoprotectants, anticaking agents, disintegrators, stabilizing agents, and antifoaming agents. In addition, if necessary, antiseptics, plant pieces, and the like may be used as additive components. These additive components may be used individually, or two or more of these may be used in combination.

Examples of the solid carriers include natural minerals such as quartz, clay, silica sand, kaolinite, pyrophyllite, sericite, talc, bentonite, acid clay, attapulgite, zeolite, and diatomaceous earth; inorganic salts such as calcium carbonate, ammonium sulfate, sodium sulfate, and potassium chloride; organic solid carriers such as synthetic silicic acid, synthetic silicate, starch, cellulose, and plant powders; plastic carriers such as polyethylene, polypropylene, and polyvinylidene chloride; urea; inorganic hollow bodies; plastic hollow bodies; and fumed silica (white carbon). These may be used individually, or two or more of these may be used in combination.

Specific examples of the liquid carriers include alcohols, for example, monohydric alcohols such as methanol, ethanol, propanol, isopropanol, and butanol, and polyhydric alcohols such as ethylene glycol, diethylene glycol, propylene glycol, hexylene glycol, polyethylene glycol, polypropylene glycol, and glycerin; polyhydric alcohol compounds such as propylene glycol ethers; ketones such as acetone, methyl ethyl ketone, methyl isobutyl ketone, diisobutyl ketone, and cyclohexanone; ethers such as ethyl ether, dioxane, ethylene glycol monoethyl ether, dipropyl ether, and tetrahydrofuran; aliphatic hydrocarbons such as normal paraffin, naphthene, isoparaffin, kerosene, and mineral oils; aromatic hydrocarbons such as benzene, toluene, xylene, solvent naphtha, alkyl benzene, and alkyl naphthalene; halogenated hydrocarbons such as dichloromethane, chloroform, and carbon tetrachloride; esters such as ethyl acetate, diisopropyl phthalate, dibutyl phthalate, dioctyl phthalate, and dimethyl adipate; lactones such as γ-butyrolactone; amides such as dimethylformamide, diethylformamide, dimethylacetamide, and N-alkylpyrrolidinone; nitriles such as acetonitrile; sulfur compounds such as dimethyl sulfoxide; vegetable oils such as soybean oil, rapeseed oil, cottonseed oil, and castor oil; and water. These may be used individually, or two or more of these may be used in combination.

Examples of the surfactants include nonionic surfactants such as sorbitan fatty acid esters, polyoxyethylene sorbitan fatty acid esters, sucrose fatty acid esters, polyoxyethylene fatty acid esters, polyoxyethylene resin acid esters, polyoxyethylene fatty acid diesters, polyoxyethylene alkyl ethers, polyoxyethylene alkyl phenyl ethers, polyoxyethylene dialkyl phenyl ethers, polyoxyethylene alkyl phenyl ether formalin condensates, alkylpolyoxyethylene polypropylene block copolymer ethers, polyoxyethylene alkylamines, polyoxyethylene fatty acid amides, polyoxyethylene fatty acid bisphenyl ethers, polyalkylene benzyl phenyl ethers, polyoxyalkylene styryl phenyl ethers, acetylene diols, polyoxyalkylene-added acetylene diols, polyoxyethylene ether-type silicones, ester-type silicones, fluorine-based surfactants, polyoxyethylene castor oils, and polyoxyethylene hydrogenated castor oils; anionic surfactants such as alkyl sulfates, polyoxyethylene alkyl ether sulfates, polyoxyethylene alkyl phenyl ether sulfates, polyoxyethylene styryl phenyl ether sulfates, alkyl benzene sulfonates, lignin sulfonates, alkyl sulfosuccinates, naphthalene sulfonates, alkyl naphthalene sulfonates, naphthalene sulfonic acid formalin condensate salts, alkyl naphthalene sulfonic acid formalin condensate salts, fatty acid salts, polycarboxylates, N-methyl-fatty acid sarcosinates, resinates, polyoxyethylene alkyl ether phosphates, and polyoxyethylene alkyl phenyl ether phosphates; cationic surfactants such as alkylamine salts including laurylamine hydrochloride, stearylamine hydrochloride, oleylamine hydrochloride, stearylamine acetate, stearylaminopropylamine acetate, alkyltrimethylammonium chloride, and alkyldimethylbenzalkonium chloride; and amphoteric surfactants such as amino acid-type or betaine-type surfactants. These surfactants may be used individually, or two or more of these may be used in combination.

Examples of the binders and the tackifiers include carboxymethyl cellulose and salts thereof, dextrin, water-soluble starch, xanthan gum, guar gum, sucrose, polyvinyl pyrrolidone, gum arabic, polyvinyl alcohol, polyvinyl acetate, sodium polyacrylate, polyoxyethylene having an average molecular weight of 6,000 to 5,000,000, and phospholipids (for example, cephalin and lecithin). These binders and tackifiers may be used individually, or two or more of these may be used in combination.

Examples of the thickeners include water-soluble macromolecules such as xanthan gum, guar gum, carboxymethyl cellulose, polyvinyl pyrrolidone, carboxyvinyl polymers, acrylic polymers, starch derivatives, and polysaccharides; and inorganic fine powders such as pure bentonite and fumed silica (fumed sirica, white carbon). These thickeners may be used individually, or two or more of these may be used in combination.

Examples of the coloring agents include inorganic pigments such as iron oxide, titanium oxide, and Prussian blue; and organic dyes such as alizarin dye, azo dye, and metal phthalocyanine dye. These coloring agents may be used individually, or two or more of these may be used in combination.

Examples of the spreaders include cellulose powders, dextrin, modified starch, polyaminocarboxylic acid chelate compounds, cross-linked polyvinyl pyrrolidone, copolymers of maleic acid and styrene, (meth)acrylic acid-based copolymers, half esters of a polymer composed of polyhydric alcohol and dicarboxylic anhydride, and water-soluble salts of polystyrene sulfonic acid. These spreaders may be used individually, or two or more of these may be used in combination.

Examples of the stickers include paraffin, terpene, polyamide resins, polyacrylate, polyoxyethylene, waxes, polyvinyl alkyl ether, alkylphenol formalin condensates, phosphoric acid esters of starch, and synthetic resin emulsions. These stickers may be used individually, or two or more of these may be used in combination.

Examples of the cryoprotectants include polyhydric alcohols such as ethylene glycol, diethylene glycol, propylene glycol, and glycerin. These cryoprotectants may be used individually, or two or more of these may be used in combination.

Examples of the anticaking agents include polysaccharides such as starch, alginic acid, mannose, and galactose; polyvinyl pyrrolidone; fumed silica (white carbon); ester gum; and petroleum resins. These anticaking agents may be used individually, or two or more of these may be used in combination.

Examples of the disintegrators include sodium tripolyphosphate, sodium hexametaphosphate, metal stearates, cellulose powders, dextrin, methacrylate copolymers, polyvinyl pyrrolidone, polyaminocarboxylic acid chelate compounds, sulfonated styrene-isobutylene-maleic anhydride copolymers, and starch-polyacrylonitrile graft copolymers. These disintegrators may be used individually, or two or more of these may be used in combination.

Examples of the stabilizing agents include desiccants such as zeolite, calcined lime, and magnesium oxide; antioxidants such as phenol compounds, amine compounds, sulfur compounds, and phosphate compounds; and ultraviolet absorbers such as salicylic acid compounds and benzophenone compounds. These stabilizing agents may be used individually, or two or more of these may be used in combination.

Examples of the antifoaming agents include dimethylpolysiloxane, modified silicone, polyether, fatty acid esters, and fatty acid salts. These antifoaming agents may be used individually, or two or more of these may be used in combination.

Examples of the antiseptics include sodium benzoate, sodium parahydroxy benzoate, potassium sorbate, and 1,2-benzothiazolin-3-one. These antiseptics may be used individually, or two or more of these may be used in combination.

Examples of the plant pieces include sawdust, coconut shell, corn cob, and tobacco stem. These plant pieces may be used individually, or two or more of these may be used in combination.

In cases where the above additive components are included in the agrochemical formulation of the present invention, their blending ratios, on a mass basis, are selected within the following ranges: carriers, usually 5 to 95%, preferably 20 to 90%; surfactants, usually 0.1 to 30%, preferably 0.5 to 10%; and other additive components, usually 0.1 to 30%, preferably 0.5 to 10%.

Using the above additive components, the agrochemical formulation of the present invention may be formulated into an arbitrary formulation such as a wettable powder, powder, wettable granule, aqueous suspension, oily suspension, granule, Jumbo formulation, suspoemulsion, or uniformly dispersible formulation. Preferred formulations include powders, granules, wettable powders, wettable granules, aqueous suspensions, and oily suspensions.

In cases where the agrochemical formulation of the present invention is a granular matter, examples of the granular matter include those having a particle size of 0.3 to 10 mm such as a spherical shape, columnar shape, spindle shape, or irregular shape.

The spherical granule has a particle size of usually 0.3 to 10 mm, preferably 0.3 to 3 mm.

The columnar granule has a diameter of usually 0.6 to 5 mm, preferably 0.8 to 3 mm, and a grain length of usually 1 to 10 mm, preferably 1.5 to 8 mm.

The spindle-shaped granule has a minor axis of usually 0.3 to 3 mm, and a major axis of usually 1 to 10 mm.

In cases where the agrochemical formulation of the present invention is a uniformly dispersible formulation, the agrochemical formulation preferably has a particle distribution in which granular matters with particle sizes of not less than 3 mm are contained at not less than 80% by mass, and, when the agrochemical formulation is dropped into water, the agrochemical formulation preferably floats on the water surface, and then disintegrates on the water surface within 30 minutes after the drop.

In the microcapsule composition or the agrochemical formulation of the present invention, one or more of other agrochemical active components may be arbitrarily mixed in addition to pyroxasulfone. The blending of the other agrochemical active component(s) herein may be carried out by encapsulating them in the microcapsule composition together with pyroxasulfone. Alternatively, a microcapsule composition containing the other agrochemical active component(s) encapsulated therein may be prepared, and then the prepared composition may be blended with the agrochemical formulation of the present invention. Alternatively, as long as the effect of the present invention is not deteriorated, an arbitrary agrochemical active component(s) that is/are not microencapsulated may be mixed. Examples of the arbitrary agrochemical active component(s) herein also include pyroxasulfone. Further, the composition may be provided as a mixed composition with an arbitrary crop injury-reducing component(s) and/or an agricultural material(s) other than agrochemicals, such as fertilizers. The blending of a crop injury-reducing component(s) is not necessarily required since the microcapsule composition or the agrochemical formulation of the present invention produces an excellent crop injury-reducing effect.

Regarding agrochemical active components that may be mixed, examples of herbicidal active components, insecticidal active components, microbicidal active components, and plant growth-regulating active components that may be blended are described below. However, the agrochemical active components in the present invention are not limited to these.

Herbicidal Active Components:

ioxynil, aclonifen, acrolein, azafenidin, acifluorfen (including its salts with sodium or the like), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, isouron, isoxachlortole, isoxaflutole, isoxaben, isoproturon, ipfencarbazone, imazaquin, imazapic (including its salts with amine or the like), imazapyr (including its salts with isopropylamine or the like), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobenzanid, endothal-disodium, oxadiazon, oxadiargyl, oxaziclomefone, oxasulfuron, oxyfluorfen, oryzalin, orthosulfamuron, orbencarb, oleic acid, cafenstrole, carfentrazone-ethyl, karbutilate, carbetamide, quizalofop-ethyl, quizalofop-P-ethyl, quizalofop-P-tefuryl, quinoclamine, quinclorac, quinmerac, cumyluron, clacyfos, glyphosate (including its salts with sodium, potassium, ammonium, amine, propylamine, isopropylamine, dimethylamine, trimesium, or the like), glufosinate (including its salts with amine, sodium, or the like), glufosinate-P-sodium, clethodim, clodinafop-propargyl, clopyralid, clomazone, chlomethoxyfen, clomeprop, cloransulam-methyl, chloramben, chloridazon, chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, ketospiradox (including its salts with sodium, calcium, ammonia, or the like), saflufenacil, sarmentine, cyanazine, cyanamide, diuron, diethatyl-ethyl, dicamba (including its salts with amine, diethylamine, isopropylamine, diglycolamine, sodium, lithium, or the like), cycloate, cycloxydim, diclosulam, cyclosulfamuron, cyclopyranil, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoseb, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sulfosate, sulfosulfuron, sulfometuron-methyl, sethoxydim, terbacil, daimuron, thaxtomin A, dalapon, thiazopyr, tiafenacil, thiencarbazone (including its sodium salt, methyl ester, and the like), tiocarbazil, thiobencarb, thidiazimin, thifensulfuron-methyl, desmedipham, desmetryne, tetflupyrolimet, thenylchlor, tebutam, tebuthiuron, tepraloxydim, tefuryltrione, tembotrione, terbuthylazine, terbutryn, terbumeton, topramezone, tralkoxydim, triaziflam, triasulfuron, triafamone, tri-allate, trietazine, triclopyr, triclopyr-butotyl, trifludimoxazin, tritosulfuron, triflusulfuron-methyl, trifluralin, trifloxysulfuron-sodium, tribenuron-methyl, tolpyralate, naptalam (including its salts with sodium or the like), naproanilide, napropamide, napropamide-M, nicosulfuron, neburon, norflurazon, vernolate, paraquat, halauxifen-benzyl, halauxifen-methyl, haloxyfop, haloxyfop-P, haloxyfop-etotyl, halosafen, halosulfuron-methyl, picloram, bixlozone, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufen-ethyl, pyridafol, pyrithiobac-sodium, pyridate, pyriftalid, pyributicarb, pyribenzoxim, pyrimisulfan, pyriminobac-methyl, pyroxsulam, phenisopham, fenuron, fenoxasulfone, fenoxaprop (including methyl, ethyl, and isopropyl esters), fenoxaprop-P (including methyl, ethyl, and isopropyl esters), fenquinotrione, fenthiaprop-ethyl, fentrazamide, phenmedipham, butachlor, butafenacil, butamifos, butylate, butenachlor, butralin, butroxydim, flazasulfuron, flamprop (including its methyl, ethyl, and isopropyl esters), flamprop-M (including its methyl, ethyl, and isopropyl esters), primisulfuron-methyl, fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl-sodium, flufenacet, flufenpyr-ethyl, flupropanate, flupoxame, flumioxazin, flumiclorac-pentyl, flumetsulam, fluridone, flurtamone, fluroxypyr, flurochloridone, pretilachlor, procarbazone-sodium, prodiamine, prosulfuron, prosulfocarb, propaquizafop, propachlor, propazine, propanil, propyzamide, propisochlor, propyrisulfuron, propham, profluazol, propoxycarbazone-sodium, profoxydim, bromacil, brompyrazon, prometryn, prometon, bromoxynil (including its ester bodies with butyric acid, octanoic acid, heptanoic acid, or the like), bromofenoxim, bromobutide, florasulam, florpyrauxifen, hexadinone, pethoxamid, benazolin, penoxsulam, heptamaloxyloglucan, beflubutamid, beflubutamid-M, pebulate, pelargonic acid, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, foramsulfuron, mecoprop (including its salts with sodium, potassium, isopropylamine, triethanolamine, dimethylamine, or the like), mecoprop-P-potassium, mesosulfuron-methyl, mesotrione, metazachlor, metazosulfuron, methabenzthiazuron, metamitron, metamifop, DSMA (disodium methanearsonate), methiozolin, methyldymuron, metoxuron, metosulam, metsulfuron-methyl, metobromuron, metobenzuron, metolachlor, metribuzin, mefenacet, monolinuron, monosulfuron (including its methyl, ethyl, and isopropyl esters), molinate, iodosulfuron, iodosulfulon-methyl-sodium, iofensulfuron, iofensulfuron-sodium, lactofen, lancotrione, linuron, rimsulfuron, lenacil, 2,3,6-TBA (2,3,6-trichlorobenzoic acid), 2,4,5-T (2,4,5-trichlorophenoxyacetic acid), 2,4-D (2,4-dichlorophenoxyacetic acid) (including its salts with amine, diethylamine, triethanolamine, isopropylamine, sodium, lithium, or the like), 2,4-DB (4-(2,4-dichlorophenoxy)butyric acid), ACN (2-amino-3-chloro-1,4-naphthoquinone), AE-F-150944 (Code No.), DNOC (4,6-dinitro-O-cresol) (including its salts with amine, sodium, or the like), EPTC (S-ethyldipropylthiocarbamate), MCPA (2-methyl-4-chlorophenoxyacetic acid), MCPA-thioethyl, MCPB (2-methyl-4-chlorophenoxybutyric acid) (including its sodium salt, ethyl ester, and the like), HW-02 (Code No.), IR-6396 (Code No.), SYP-298 (Code No.), SYP-300 (Code No.), S-metolachlor, S-9750 (Code No.), MSMA (monosodium methanearsonate), and TCA (2,2,2-trichloroacetic acid) (including its salts with sodium, calcium, ammonia, or the like).

Insecticidal Active Components:

acrinathrin, azadirachtin, azamethiphos, azinphos-ethyl, azinphos-methyl, acequinocyl, acetamiprid, acetoprole, acephate, azocyclotin, abamectin, afidopyropen, afoxolaner, amidoflumet, amitraz, alanycarb, aldicarb, aldoxycarb, allethrin [including its d-cis-trans body and d-trans body], isazophos, isamidofos, isocarbophos, isoxathion, isocycloseram, isofenphos-methyl, isoprocarb, ivermectin, imicyafos, imidacloprid, imiprothrin, indoxacarb, esfenvalerate, ethiofencarb, ethion, ethiprole, ethylene dibromide, etoxazole, etofenprox, ethoprophos, etrimfos, emamectin benzoate, endosulfan, empenthrin, oxazosulfyl, oxamyl, oxydemetonmethyl, oxydeprofos, omethoate, cadusafos, kappa-teflu-thrin, kappa-bifenthrin, kadethrin, karanjin, cartap, carbaryl, carbosulfan, carbofuran, gamma-BHC, xylylcarb, quinalphos, kinoprene, chinomethionat, coumaphos, cryolite, clothianidin, clofentezine, chromafenozide, chlorantraniliprole, chlorethoxyfos, chlordane, chloropicrin, chlorpyrifos, chlorpyrifos-methyl, chlorfenapyr, chlorfenvinphos, chlorfluazuron, chlormephos, chloroprallethrin, cyanophos, diafenthiuron, diamidafos, cyantraniliprole, dienochlor, cyenopyrafen, dioxabenzofos, diofenolan, cyclaniliprole, dicrotophos, dichlofenthion, cycloprothrin, dichlorvos, dicloromezotiaz, 1,3-dichloropropene, dicofol, dicyclanil, disulfoton, dinotefuran, dinobuton, cyhalodiamide, cyhalothrin [including its gamma-body and lambda-body], cyphenothrin [including its (1R)-trans-body], cyfluthrin [including its beta-body], diflubenzuron, cyflumetofen, diflovidazin, cyhexatin, cypermethrin [including its alpha-body, beta-body, theta-body, and zeta-body], dimpropyridaz, dimethylvinphos, dimefluthrin, dimethoate, silafluofen, cyromazine, spinetoram, spinosad, spirodiclofen, spirotetramat, spiropidion, spiromesifen, sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tyclopyrazoflor, tetrachlorantraniliprole, tetrachlorvinphos, tetradifon, tetraniliprole, tetramethylfluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, triflumuron, triflumezopyrim, trimethacarb, tolfenpyrad, naled, nitenpyram, novaluron, noviflumuron, *Verticillium lecanii*, hydroprene, *Pasteuria penetrans* spores, vamidothion, parathion, parathion-methyl, halfenprox, halofenozide, bioallethrin, bioallethrin S-cyclopentenyl, bioresmethrin, bistrifluron, hydramethylnon, bifenazate, bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrine, famphur, fipronil, fenazaquin, fenamiphos, fenitrothion, fenoxycarb, fenothiocarb, phenothrin [including its (1R)-trans-body], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazaindolizine, fluazuron, fluensulfone, sodium fluoroacetate, fluxametamide, flucycloxuron, flucythrinate, flusulfamide, fluvalinate [including its tau-body], flupyradifurone, flupyrazofos, flupyrimin, flufiprole, flufenerim, flufenoxystrobin, flufenoxuron, fluhexafon, flubendiamide, flumethrin, fluralaner, prothiofos, protrifenbute, flonicamid, propaphos, propargite, profenofos, broflanilide, brofluthrinate, profluthrin, propetamphos, propoxur, flometoquin, bromopropylate, hexythiazox, hexaflumuron, *Paecilomyces tenuipes, Paecilomyces fumosoroceus*, heptafluthrin, heptenophos, permethrin, benclothiaz, benzpyrimoxan, bensultap, benzoximate, bendiocarb, benfuracarb, *Beauveria tenella, Beauveria bassiana, Beauveria brongniartii*, phoxim, phosalone, fosthiazate, fosthietan, phosphamidon, phosmet, polynactins, formetanate, phorate, malathion, milbemectin, mecarbam, mesulfenfos, methomyl, metaflumizone, methamidophos, metham, methiocarb, methidathion, methyl isothiocyanate, methyl bromide, methoxychlor, methoxyfenozide, methothrin, metofluthrin, epsilon-metofluthrin, methoprene, metolcarb, mevinphos, meperfluthrin, *Monacrosporium phymatophagum*, monocrotophos, momfluorothrin, epsilon-momfluorothrin, litlure-A, litlure-B, aluminium phosphide, zinc phosphide, phosphine, lufenuron, rescalure, resmethrin, lepimectin, rotenone, fenbutatin oxide, calcium cyanide, nicotine sulfate, (Z)-11-tetradecenyl=acetate, (Z)-11-hexadecenal, (Z)-11-hexadecenyl=acetate, (Z)-9,12-tetradecadienyl=acetate, (Z)-9-tetradecen-1-ol, (Z,E)-9,11-tetradecadienyl=acetate, (Z,E)-9,12-tetradecadienyl=acetate, *Bacillus popilliae, Bacillus subtillis, Bacillus sphaericus, Bacillus thuringiensis* subsp. *aizawai, Bacillus thuringiensis* subsp. *israelensis, Bacillus thuringiensis* subsp. *kurstaki, Bacillus thuringiensis* subsp. *tenebrionis*, Bt proteins (Cry1Ab, Cry1Ac, Cry1Fa, Cry2Ab, mCry3A, Cry3Ab, Cry3Bb, Cry34/35Ab1), CL900167 (Code No.), DCIP (bis-(2-chloro-1-methylethyl) ether), DDT (1,1,1-trichloro-2,2-bis(4-chlorophenyl) ethane), DEP (dimethyl-2,2,2-trichloro-1-hydroxyethylphosphonate), DNOC (4,6-dinitro-o-cresol), DSP (O,O-diethyl-O-[4-(dimethylsulfamoyl)phenyl]-phosphorothioate), EPN (O-ethyl 0-(4-nitrophenyl)phenylphosphonothioate), nuclear polyhedrosis virus inclusion body, NA-85 (Code No.), NA-89 (Code No.), NC-515 (Code No.), RU15525 (Code No.), XIVIC, Z-13-icosen-10-one, ZX18901 (Code No.), 2-chloro-4-fluoro-5-[(5-trifluoromethylthio)pentyloxy]phenyl 2,2,2-trifluoroethyl sulfoxide (chemical name, CAS No.: 1472050-04-6), 2,4-dichloro-5-{2-[4-(trifluoromethyl)phenyl]ethoxy}phenyl 2,2,2-trifluoroethyl sulfoxide (chemical name, CAS No.: 1472052-11-1), 2,4-dimethyl-5-[6-(trifluoromethylthio)hexyloxy]phenyl-2,2,2-trifluoroethyl sulfoxide (chemical name, CAS No.: 1472050-34-2), 2-{2-fluoro-4-methyl-5-[(2,2,2-trifluoroethyl)sulfinyl]phenoxy}-5-(trifluoromethyl)pyridine (chemical name, CAS No.: 1448758-62-0), 3-chloro-2-{2-fluoro-4-methyl-5-[(2,2,2-trifluoroethyl)sulfinyl]phenoxy}-5-(trifluoromethyl)pyridine (chemical name, CAS No.: 1448761-28-1), 4-fluoro-2-methyl-5-(5,5-dimethylhexyloxy)phenyl 2,2,2-trifluoroethyl sulfoxide (chemical name, CAS No.: 1472047-71-4), and NI-30 (Code No.).

Microbicidal Active Components:

azaconazole, acibenzolar-S-methyl, azoxystrobin, anilazine, amisulbrom, aminopyrifen, ametoctradin, aldimorph, isotianil, isopyrazam, isofetamid, isoflucypram, isoprothiolane, ipconazole, ipflufenoquin, iprodione, iprovalicarb, iprobenfos, imazalil, iminoctadine-tris-albesilate, iminoctadine-triacetate, imibenconazole, inpyrfluxam, imprimatin A, imprimatin B, edifenphos, etaconazole, ethaboxam, ethirimol, ethoxyquin, etridiazole, enestroburin, epoxiconazole, organic oils, oxadixyl, oxazinylazole, oxathiapiprolin, oxycarboxin, oxine-copper, oxytetracycline, oxpoconazole-fumarate, oxolinic acid, copper dioctanoate, octhilinone, ofurace, orysastrobin, o-phenylphenol, kasugamycin, captafol, carpropamid, carbendazim, carboxin, carvone, quinoxyfen, quinofumelin, chinomethionat, captan, quinconazole, quintozene, guazatine, cufraneb, coumoxystrobin, kresoximmethyl, clozylacon, chlozolinate, chlorothalonil, chloroneb, cyazofamid, diethofencarb, diclocymet, dichlofluanid, dichlobentiazox, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, ziram, silthiofam, streptomycin, spiroxamine, sedaxane, zoxamide, dazomet, tiadinil, thiabendazole, thiram, thiophanate, thiophanate-methyl, thifluzamide, tecnazene, tecloftalam, tetraconazole, debacarb, tebuconazole, tebufloquin, terbinafine, dodine, dodemorph, triadimenol, triadimefon, triazoxide, trichlamide, triclopyricarb, tricyclazole, triticonazole, tridemorph, triflumizole, trifloxystrobin, triforine, tolylfluanid, tolclofos-methyl, tolnifanide, tolprocarb, nabam, natamycin, naftifine, nitrapyrin, nitrothal-isopropyl, nuarimol, copper nonyl phenol sulphonate, *Bacillus subtilis* (strain: QST 713), validamycin, valifenalate, picarbutrazox, bixafen, picoxystrobin, pydiflumetofen, bitertanol, binapacryl, biphenyl, piperalin, hymexazol, pyraoxystrobin, pyraclostrobin, pyraziflumid, pyrazophos, pyrapropoyne, pyrametostrobin, pyriofenone, pyrisoxazole, pyridachlometyl, pyrifenox, pyributicarb, pyribencarb, pyrimethanil, pyroquilon, vinclozolin, ferbam, famoxadone, phenazine oxide, fenamidone, fenaminstrobin, fenarimol, fenoxanil, ferimzone, fenpiclonil, fenpicoxamid, fenpyrazamine, fenbuconazole, fenfuram, fenpropidin, fenpropimorph, fenhexamid, folpet, phthalide, bupirimate, fuberidazole, blasticidin-S, furametpyr, furalaxyl, furancarboxylic acid, fluazinam, fluoxastrobin, fluoxapiprolin, fluopicolide, fluopimomide, fluopyram, fluoroimide, fluindapyr, fluxapyroxad, fluquinconazole, furconazole, furconazole-cis, fludioxonil, flusilazole, flusulfamide, flutianil, flutolanil, flutriafol, flufenoxystrobin, flumetover, flumorph, proquinazid, prochloraz, procymidone, prothiocarb, prothioconazole, bronopol, propamocarb-hydrochloride, propiconazole, propineb, probenazole, bromuconazole, florylpicoxamid, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (alminium, calcium, sodium), polyoxin, polycarbamate, Bordeaux mixture, mancozeb, mandipropamid, mandestrobin, maneb, myclobutanil, mineral oils, mildiomycin, methasulfocarb, metam, metalaxyl, metalaxyl-M, metiram, metyltetraprole, metconazole, metominostrobin, metrafenone, mepanipyrim, mefentrifluconazole, meptyldinocap, mepronil, iodocarb, laminarin, phosphorous acid and salts, copper oxychloride, silver, cuprous oxide, copper hydroxide, potassium bicarbonate, sodium bicarbonate, sulfur, oxyquinoline sulfate, copper sulfate, (3,4-dichloroisothiazol-5-yl) methyl 4-(tert-butyl)benzoate (chemical name, CAS No. 1231214-23-5), BAF-045 (Code No.), BAG-010 (Code No.), UK-2A (Code No.), DBEDC (dodecylbenzenesulfonic acid bisethylenediamine copper [II] salt), MIF-1002 (Code No.), NF-180 (Code No.), TPTA (triphenyltin acetate), TPTC (triphenyltin chloride), TPTH (triphenyltin hydroxide), and nonpathogenic *Erwinia carotovora*.

Plant Growth-Regulating Active Components:

1-naphthylacetamide, 1-methylcyclopropene, 2,6-diisopropylnaphthalene, 4-CPA (4-chlorophenoxyacetic acid), 4-oxo-4-(2-phenylethyl) aminobutyric acid (chemical name, CAS No. 1083-55-2), aviglycine, ancymidol, inabenfide, indole acetic acid, indole butyric acid, uniconazole, uniconazole-P, ethychlozate, ethephon, epocholeone, carvone, cloxyfonac, cloxyfonac-potassium, cloprop, chlormequat, cytokinins, cyclanilide, dikegulac, gibberellins, dimethipin, sintofen, daminozide, thidiazuron, n-decanol, triacontanol, trinexapac-ethyl, paclobutrazol, flumetralin, flurprimidol, flurenol, pronitridine, prohydrojasmon, prohexadione-calcium, benzylaminopurine, forchlorfenuron, maleic hydrazide, mepiquat chloride, mefluidide, and calcium peroxide.

Examples of crop injury-reducing active components that may be blended are described below. However, the crop injury-reducing active components in the present invention are not limited to these.

Crop Injury-Reducing Active Components:

AD-67 (4-dichloroacetyl-1-oxa-4-azaspiro [4.5] decane), DKA-24 (N1,N2-diallyl-N2-dichloroacetylglycinamide), MG-191 (2-dichloromethyl-2-methyl-1,3-dioxane), N-(2-methoxybenzoyl)-4-[(methylaminocarbonyl)amino] benzenesulfonamide (chemical name, CAS No. 129531-12-0), PPG-1292 (2,2-dichloro-N-(1,3-dioxan-2-ylmethyl)-N-(2-propenyl) acetamide), R-29148 (3-dichloroacetyl-2,2,5-trimethyl-1,3-oxazolidine), TI-35 (1-dichloroacetylazepane), isoxadifen, isoxadifen-ethyl, oxabetrinil, cloquintcet-mexyl, cyometrinil, dichlormid, dicyclonone, cyprosulfamide, 1,8-naphthalic anhydride, fenchlorazole-ethyl, fenclorim, furilazole, fluxofenim, flurazole, benoxacor, mefenpyr, mefenpyr-ethyl, mefenpyr-diethyl, and lower alkyl-substituted benzoic acid.

The agrochemical formulation of the present invention may be packed in a water-soluble film. This contributes to labor saving, and can increase safety, upon application of the formulation.

A method of producing the agrochemical formulation of the present invention is not limited. Usually, the following methods are used.

(1) A method in which an appropriate amount of water is added to a mixture of the microcapsule composition of the present invention and the other materials, and the mixture is then kneaded, followed by extruding the mixture from a screen in which holes with a certain size are formed, to thereby perform granulation, and then drying the resulting granules.

(2) A method in which the microcapsule composition of the present invention and the other materials are mixed in water or an appropriate solvent, and then uniformly suspended.

(3) A method in which the microcapsule composition of the present invention is mixed with an appropriate carrier, and then dried, followed by mixing the dried product with the other materials.

A weed control method of the present invention includes a step of performing treatment with the microcapsule composition of the present invention, or with the agrochemical formulation of the present invention, in agricultural land for growing a useful plant.

In the weed control method of the present invention, the method of performing treatment with the microcapsule composition or the agrochemical formulation of the present invention is not limited. The treatment may be carried out according to a conventional ordinary method of, for example, soil treatment or foliage treatment. The microcapsule composition or the agrochemical formulation of the present invention may be used either before or after germination of the weed to be controlled.

The weed control method of the present invention is especially effective for dry fields. Examples of the useful plant include wheat, barley, rye, maize, sorghum, soybean, rapeseed, safflower, sunflower, flax, peanut, sesame, potato, sweet potato, onion, garlic, sugar beet, cotton, mint, and lawn grass. The method is especially effective for dry fields for growing soybean or cotton.

EXAMPLES

The present invention is described below in detail by way of Examples and Test Examples. However, the present invention is not limited by these Examples. In the following Examples, "part" means part by mass, and "%" means % by mass.

Example 1

To 15 parts of phenylxylylethane (manufactured by Nippon Petrochemicals Co., Ltd., trade name "Hisol SAS-296"), 9.1 parts of isocyanate (manufactured by Tosoh Corporation, trade name "Coronate 1130") was added, and the resulting mixture was stirred at room temperature using a dissolver (manufactured by PRIMIX Corporation, product name "T.K. ROBOMIX") at a peripheral speed of 9,425 mm/s for 3 minutes, followed by further adding 66.46 parts of 1% aqueous polyvinyl alcohol solution thereto and stirring the resulting mixture at 9,425 mm/s for 5 minutes. To the resulting suspended solution, 5 parts of pyroxasulfone and 0.1 parts of a silicone-based antifoaming agent (manufactured by Asahi Dyestuff Mfg. Co., Ltd., trade name "Asahi Silicone AF-128") were added, and the resulting mixture was stirred at a peripheral speed of 9,425 mm/s for 10 minutes. Subsequently, the mixture was stirred at 60° C. for 3 hours at a peripheral speed of 785 mm/s, and then 2.0 parts of a polyoxyethylene polyoxypropylene block copolymer (manufactured by DKS Co. Ltd., trade name "EPAN® 410") was added thereto, followed by stirring the mixture for additional 1 hour. After the reaction, 4.0 parts of sodium salt of a naphthalene sulfonic acid formaldehyde condensate (manufactured by Kao Corporation, trade name "DEMOL SN-B") was added to the mixture at room temperature, and stirring was further carried out at a peripheral speed of 3,142 mm/s for 5 minutes. After adding 0.2 parts of xanthan gum (manufactured by Sansho Co., Ltd., trade name "KELZAN®") thereto, the resulting mixture was stirred for 10 minutes, and then subjected to separation using a screen with an aperture of about 300 μm (48 mesh), to obtain a microcapsule composition containing pyroxasulfone encapsulated therein. This composition was obtained as spherical particles having an average particle size of 15.9 μm.

Example 2

A microcapsule composition containing pyroxasulfone encapsulated therein was obtained in the same manner as in Example 1 except that the peripheral speed after the addition of pyroxasulfone was 12,566 mm/s instead of 9425 mm/s. This composition was spherical particles having an average particle size of 8.9 μm.

Example 3

A microcapsule composition containing pyroxasulfone encapsulated therein was obtained in the same manner as in Example 1 except that the peripheral speed after the addition of pyroxasulfone was 6,283 mm/s instead of 9,425 mm/s. This composition was spherical particles having an average particle size of 14.0 μm.

Comparative Example 1

A microcapsule composition containing pyroxasulfone encapsulated therein was obtained in the same manner as in Example 1 except that the peripheral speed after the addition of pyroxasulfone was 4,189 mm/s instead of 9,425 mm/s. This composition was spherical particles having an average particle size of 23.5 μm.

Test Example 1: Evaluation Test for Crop Injury to Soybean by Soil Treatment

Field soil was filled in a plastic pot of 11 cm (length)×11 cm (width)×11 cm (depth), and soybean was seeded therein, followed by covering the seeds with the soil. The microcapsule compositions obtained in Examples 1 to 3 and Comparative Example 1, a commercially available pyroxasulfone-containing flowable agent (manufactured by BASF, product name "ZIDUA SC") as Comparative Example 2, and a commercially available pyroxasulfone-containing wettable granule (manufactured by Kumiai Chemical Industry Co., Ltd., product name "SOLISTE WG") as Comparative Example 3 were weighed and taken such that the amount of pyroxasulfone per hectare became 210 g. Each of these was diluted with water, and uniformly sprayed on the soil using a compact sprayer with a spray volume of 200 L per hectare. Thereafter, the soybean was grown in a greenhouse, and its plant height was measured on Day 19 after the treatment. The measurement results are shown in Table 1.

TABLE 1

|  | Peripheral speed (mm/s) | Plant height of soybean (cm) |
|---|---|---|
| Example 1 | 9425 | 23 |
| Example 2 | 12566 | 21 |
| Example 3 | 6283 | 19 |
| Comparative Example 1 | 4189 | 17 |
| Comparative Example 2 | — | 16 |
| Comparative Example 3 | — | 16 |

Test Example 2: Evaluation Test for Crop Injury to Soybean by Foliage Treatment

Field soil was filled in a plastic pot of 11 cm (length)×11 cm (width)×11 cm (depth), and soybean was seeded therein, followed by covering the seeds with the soil. When the soybean grew to reach the two true leaves-unfolded stage, the microcapsule compositions obtained in Examples 1 to 3 and Comparative Example 1, the flowable agent of Comparative Example 2, and the wettable granule of Comparative Example 3 were weighed and taken such that the amount of pyroxasulfone per hectare became 210 g. Each of these was diluted with water, and uniformly sprayed over the soybean to perform foliage spray using a compact sprayer with a spray volume of 200 L per hectare. Thereafter, the plant was grown in a greenhouse, and investigated by observation on Day 19 after the treatment. A test group that had not been treated with the agents was provided as a control group. According to the standard shown in Table 2, the degree of crop injury was evaluated using an index, and rated on an 11-point scale from 0 to 10. The results of the investigation are shown in Table 3.

TABLE 2

Herbicidal effect on the above-ground part,
Index and the degree of crop injury

| 0 | Same as in the control group, or growth inhibition of less than 10% |
| 1 | Growth inhibition of not less than 10% and less than 20% |
| 2 | Growth inhibition of not less than 20% and less than 30% |
| 3 | Growth inhibition of not less than 30% and less than 40% |
| 4 | Growth inhibition of not less than 40% and less than 50% |
| 5 | Growth inhibition of not less than 50% and less than 60% |
| 6 | Growth inhibition of not less than 60% and less than 70% |
| 7 | Growth inhibition of not less than 70% and less than 80% |
| 8 | Growth inhibition of not less than 80% and less than 90% |
| 9 | Growth inhibition of not less than 90% and less than 100% |
| 10 | Growth inhibition of 100% (complete death) |

TABLE 3

|  | Amount of pyroxasulfone (g/ha) | Soybean injury index (on Day 19 after treatment) |
|---|---|---|
| Example 1 | 210 | 1 |
| Example 2 | 210 | 1 |
| Example 3 | 210 | 2 |
| Comparative Example 1 | 210 | 3 |
| Comparative Example 2 | 210 | 3 |
| Comparative Example 3 | 210 | 3 |

Test Example 3: Evaluation Test for Herbicidal Effect of Dry Field Soil Treatment on Weeds Field soil was filled in a plastic pot of 11 cm (length)×11 cm (width)×11 cm (depth), and *Echinochloa crus-galli* var. *crus-galli* (inubie) was seeded therein, followed by covering the seeds with the soil. Thereafter, the microcapsule composition obtained in Example 1 and the flowable agent of Comparative Example 2 were weighed and taken such that the amount of pyroxasulfone per hectare became 90 g. Each of these was diluted with water, and uniformly sprayed on the soil surface using a compact sprayer with a spray volume of 200 L per hectare. Thereafter, the plant was grown in a greenhouse, and investigated by observation on Day 20 after the treatment. A test group that had not been treated with the agents was provided as a control group. According to the standard shown in Table 2, the degree of the herbicidal effect was evaluated using an index, and rated on an 11-point scale from 0 to 10. The results of the investigation are shown in Table 4.

TABLE 4

|  | Amount of pyroxasulfone (g/ha) | Herbicidal effect index (on Day 20 after treatment) |
|---|---|---|
| Example 1 | 90 | 10 |
| Comparative Example 2 | 90 | 10 |

The invention claimed is:

1. A method of producing a microcapsule composition containing pyroxasulfone encapsulated therein, the method comprising:
    an emulsifying dispersion step of performing a high-speed stirring of pyroxasulfone crystal particles, an isocyanate, an oily phase, and an aqueous phase at a peripheral speed of 9,000 to 12,566 mm/s to allow emulsifying dispersion of the oily phase in the aqueous phase, to form emulsion particles of the oily phase; and
    a film formation step of forming a film on at least a surface of the emulsion particles of the oily phase formed by the emulsifying dispersion step,
    wherein the aqueous phase comprises water, polyvinyl alcohol, and a polyoxyethylene polyoxypropylene block copolymer.

2. The method of producing a microcapsule composition according to claim 1, wherein the isocyanate is an aromatic isocyanate.

3. The method of producing a microcapsule composition according to claim 1, wherein, in the film formation step, the isocyanate is reacted with water in the aqueous phase, to form a film containing polyurea as a material on at least the surface of the emulsion particles of the oily phase formed by the emulsifying dispersion step.

4. The method of producing a microcapsule composition according to claim 1, wherein the microcapsule composition has a volume average diameter of 5 to 100 μm.

5. The method of producing a microcapsule composition according to claim 1, wherein the pyroxasulfone crystal particles have a volume average diameter of 2 to 50 μm.

6. A microcapsule composition produced by the method according to claim 1.

7. The microcapsule composition according to claim 6, comprising a surface, wherein the pyroxasulfone crystal particles are not exposed on the surface of the microcapsule composition.

8. An agrochemical formulation comprising the microcapsule composition according to claim 6.

9. The agrochemical formulation according to claim 8, which is a powder, a granule, a wettable powder, a wettable granule, an aqueous suspension, or an oily suspension.

10. The agrochemical formulation according to claim 8, containing no crop injury-reducing agent.

11. A method of controlling a weed, comprising performing a treatment with the microcapsule composition according to claim 6, or with an agrochemical formulation comprising the microcapsule composition according to claim 6, in an agricultural land for growing a useful plant.

12. The method according to claim 11, wherein the useful plant is soybean or cotton.

13. The method according to claim 11, wherein the agricultural land is a dry field.

14. The method according to claim 11, wherein the treatment is a soil treatment or a foliage treatment.

* * * * *